(12) United States Patent
Parulski et al.

(10) Patent No.: US 6,650,366 B2
(45) Date of Patent: Nov. 18, 2003

(54) DIGITAL PHOTOGRAPHY SYSTEM USING DIRECT INPUT TO OUTPUT PIXEL MAPPING AND RESIZING

(75) Inventors: Kenneth A. Parulski, Rochester, NY (US); James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/048,605

(22) Filed: Mar. 26, 1998

(65) Prior Publication Data

US 2003/0058354 A1 Mar. 27, 2003

(51) Int. Cl.[7] .................. H04N 5/76; H04N 3/14; H04N 11/00; H04N 5/262
(52) U.S. Cl. ............... 348/231.6; 348/273; 348/552; 348/239
(58) Field of Search ................. 348/239, 272, 348/273, 252, 552, 581, 582, 333.1, 240, 231, 231.6

(56) References Cited

U.S. PATENT DOCUMENTS

| | | | |
|---|---|---|---|
| 3,971,065 A | 7/1976 | Bayer | 358/41 |
| 4,630,307 A * | 12/1986 | Cok | 348/252 |
| 4,642,678 A * | 2/1987 | Cok | 348/242 |
| 5,018,017 A | 5/1991 | Sasaki et al. | 358/209 |
| 5,065,229 A * | 11/1991 | Tsai et al. | 348/391.1 |
| 5,373,322 A | 12/1994 | Laroche et al. | 348/273 |
| 5,382,976 A | 1/1995 | Hibbard | 348/273 |
| 5,418,565 A * | 5/1995 | Smith | 348/273 |
| 5,493,335 A | 2/1996 | Parulski et al. | 348/233 |
| 5,506,619 A | 4/1996 | Adams, Jr. et al. | 348/272 |
| 5,629,734 A | 5/1997 | Hamilton, Jr. et al. | 348/222 |
| 5,696,850 A | 12/1997 | Parulski et al. | 382/261 |
| 5,821,999 A * | 10/1998 | Barnsley et al. | 348/272 |
| 5,900,909 A * | 5/1999 | Parulski et al. | 348/232 |
| 5,973,734 A * | 10/1999 | Anderson | 348/239 |
| 6,005,613 A * | 12/1999 | Endsley et al. | 348/231 |
| 6,091,851 A * | 7/2000 | Acharya | 348/167 |

* cited by examiner

Primary Examiner—Wendy R. Garber
Assistant Examiner—Lin Ye
(74) Attorney, Agent, or Firm—Pamela R. Crocker

(57) ABSTRACT

An electronic still imaging system employs an image sensor comprised of discrete light sensitive picture elements overlaid with a color filter array (CFA) pattern to produce color image data corresponding to the CFA pattern, an A/D converter for producing digital CFA image data from the color image data, and a memory for storing the digital CFA image data from a fixed number of input picture elements corresponding to a fixed image size. A user selects at least one output image size different from the fixed image size, such that the output image will have a different number of picture elements than the fixed number of picture elements in the fixed size image. A processor then interpolates full color data for each picture element and produces an interpolated output image having the selected output image size. By directly mapping the input picture elements to the desired output picture elements in a single stage that includes CFA interpolation, interpolation artifacts are minimized.

10 Claims, 6 Drawing Sheets

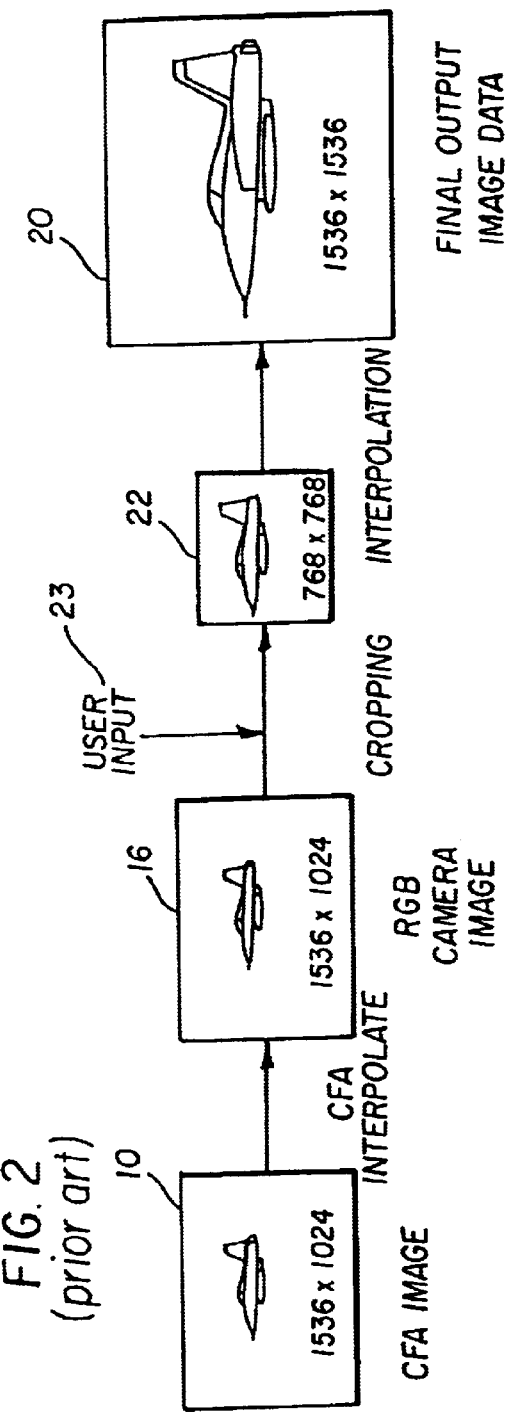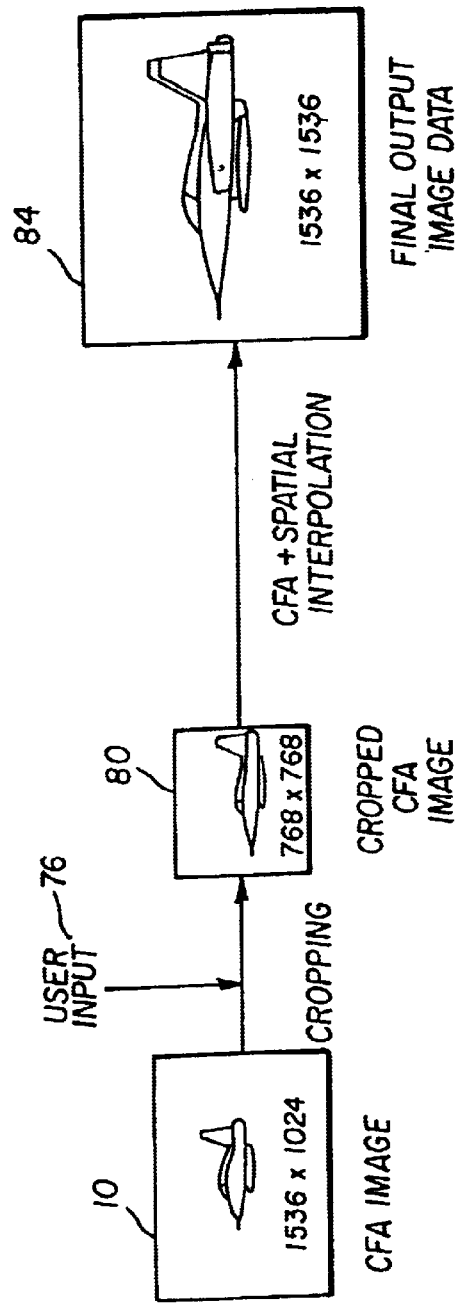

DIGITAL PHOTOGRAPHY SYSTEM USING DIRECT INPUT TO OUTPUT PIXEL MAPPING AND RESIZING

CROSS-REFERENCE TO RELATED APPLICATION

Reference is made to commonly assigned copending applications Ser. No. [our Docket No. 76,651], entitled "Digital Image File Format for Storage and Selective Transmission of Processed and Unprocessed Image Data from a Digital Still Camera" and filed on common date herewith in the names of Kenneth A. Parulski and J. Scott Houchin, and which is assigned to the assignee of this application.

FIELD OF THE INVENTION

The invention related generally to the field of electronic photography, and in particular to a single sensor camera of the type that requires color filter array interpolation.

BACKGROUND OF THE INVENTION

A typical digital camera uses a single color image sensor to capture a representation of a scene, including a representation of the color in the scene. The colors are separated by a color filter array (CFA) that overlies the sensor and associates each image pixel with a particular color according to the particular color pattern of the CFA. For example, the Bayer CFA (described in U.S. Pat. No. 3,971,065) provides an RGB pattern with a checkerboard arrangement of green pixel sites. Therefore, the primary CFA image signal for each pixel relates to but one color, that is, to either red, green or blue (for a Bayer CFA). After the CFA image is captured, the remaining (missing) colors for each pixel site are interpolated for each pixel from, e.g., surrounding pixels, so that a full resolution interpolated record is generated for each image. Each pixel in the interpolated record therefore has a set of RGB values.

Digital cameras, such as the Kodak DCS 420c camera, store the uncompressed digital images data from a single-sensor color camera (approximately 1024×1536 pixels) on a removable digital hard drive memory. When the camera or memory is connected to a host computer, the images can be imported into an image processing program such as Adobe Photoshop™. A typical flow diagram for such a capture sequence and processing program is shown in FIG. 1, and a representation of the image size for selected stages in the flow diagram is shown in FIG. 2. A CFA image 10 is captured in a capture step 12 by the camera. The CFA images are subsequently processed in a CFA interpolation step 14 as they are imported, using known CFA interpolation, color correction, and sharpening techniques, in order to create a "finished" RGB image file having a standard size. The finished RGB image file thus contains the CFA interpolated image 16, which has the same number of total pixels as the original image (for example, approximately 1024 ×1536 pixels for the DCS 420c camera). Unlike the original image, however, the CFA interpolated image 16 has complete RGB data for each pixel.

To create the final printed images, the imported image is typically adjusted by the user via an image processing stage, such as provided by a program like Adobe Photoshopä, to create a final output image 20 of the desired size, which may include only a "cropped" portion 22 of the image captured by the camera. User crop selection is thus performed at a user input stage 23 after CFA interpolation of the image data. More specifically, to provide the appropriately sized output image, the image processing program first crops the 1024×1536 RGB CFA interpolated image data in a cropping step 18, and then uses another interpolation algorithm in an interpolating step 24 to convert from the cropped version of the "finished" RGB image file to the final desired output image 20. Note that this prior art approach uses two interpolation steps, one (step 14) to interpolate "missing" RGB data from the image sensor while maintaining the 1024×1536 pixel data array that provides the desired output size. For example, to produce an approximately 7"×10" print using a printer with 300 pixels per inch, 2× (two times) up-interpolation is used to create a 2048×3072 pixel data array. In addition, this known approach often uses two separate sharpening operations, one on the 1024×1536 pixel CFA interpolated image data following the CFA interpolation step 14, and a second one on the interpolated 2048×3072 pixel image data array just prior to printing.

The prior art approach thus has a number of problems. First, the processing time is longer, since pixels that will be cropped out of the final image are still processed by the CFA interpolation processing. Second, the two interpolation steps provide more interpolation artifacts than would be produced using a single interpolation step. Finally, using two separate sharpening steps can also produce artifacts. What is needed is a digital camera system that enables both interpolation processes to be completed in a single step, to provide both faster processing and improved image quality.

SUMMARY OF THE INVENTION

The present invention is directed to overcoming one or more of the problems set forth above. Briefly summarized, according to one aspect of the present invention, an electronic still imaging system employs an image sensor comprised of discrete light sensitive picture elements overlaid with a color filter array (CFA) pattern to produce color image data corressponding to the CFA pattern, an A/D converter for producing digital CFA image data from the color image data, and a memory for storing the digital CFA image data from a fixed number of picture elements corresponding to a fixed image size. A user selects at least one output image size different from the fixed image size, such that the output image will have a different number of picture elements than the fixed number of picture elements in the fixed size image. A processor then interpolates full color data for each picture element and produces an interpolated output image having the selected output image size.

According to this invention, the "original" image data (which is optionally compressed using a numerically lossless or visually lossless technique) is stored in a digital image file on a digital memory and transferred to the host computer. This image file is retained until a final rendered image is created. A "soft copy" quality version of the image can be displayed to the user, who can decide to crop the image and to create an output image of any size to be printed, incorporated into other documents, etc. The advantage of the invention is this: To create the final high quality image, the cropped portion of the original pixel data is directly interpolated (and optionally sharpened) in a single stage to create the proper output image size. By directly mapping the input pixels to the desired output pixels in a single stage that includes CFA interpolation, interpolation artifacts are minimized. In addition, if the image is sharpened in this stage, the sharpness of the output image is improved without degradation from artifacts due to multiple sharpening stages.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWING

FIG. 2 is a representation of image size for selected steps in the flow diagram of FIG. 1.

FIG. 5 is a representation of image size for selected steps in the flow diagram of FIG. 4.

DETAILED DESCRIPTION OF THE INVENTION

Because digital cameras employing electronic sensors, and electronic processing and storage of the resultant image data, are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 1:
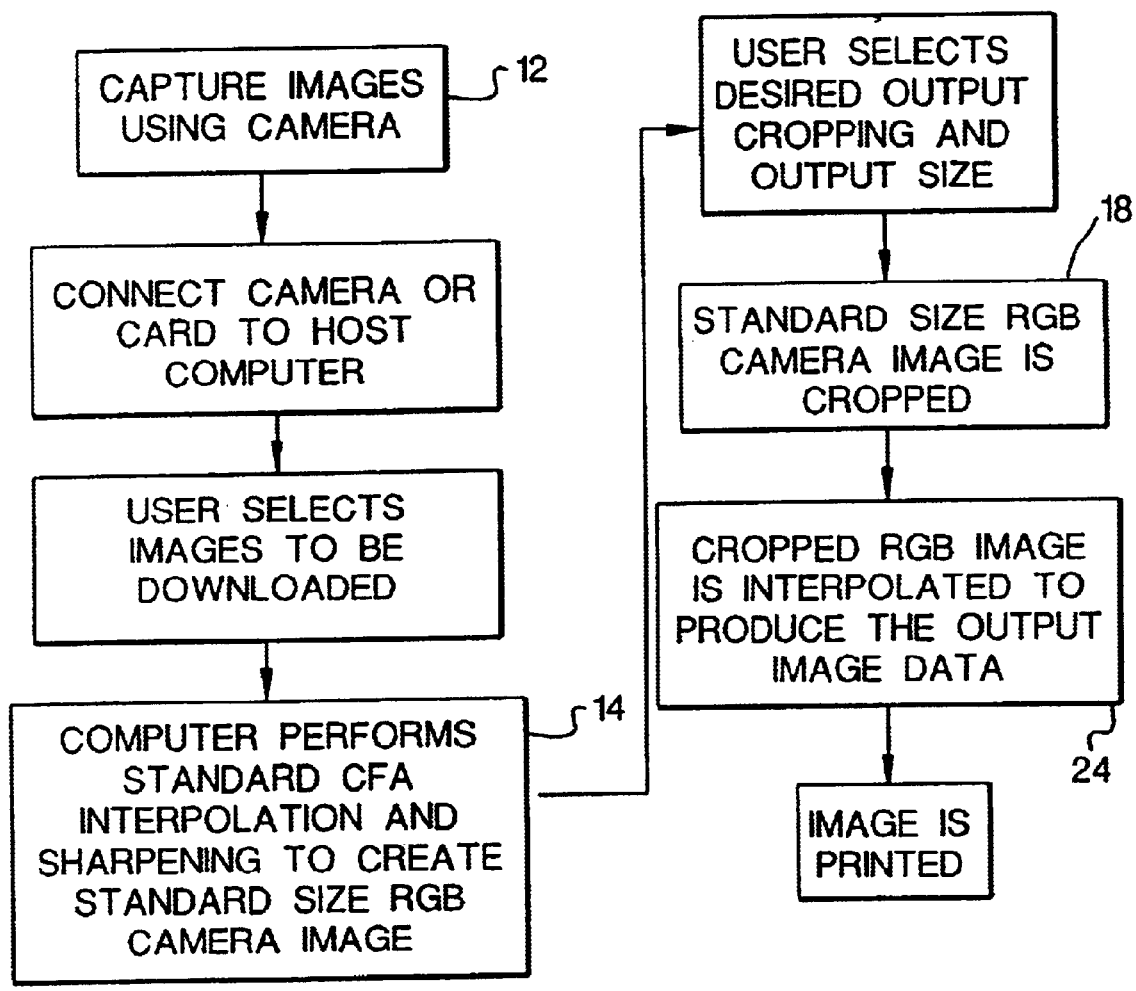
FIG. 1 is a flow diagram of a known technique for capturing and processing image data.
Figure 3:
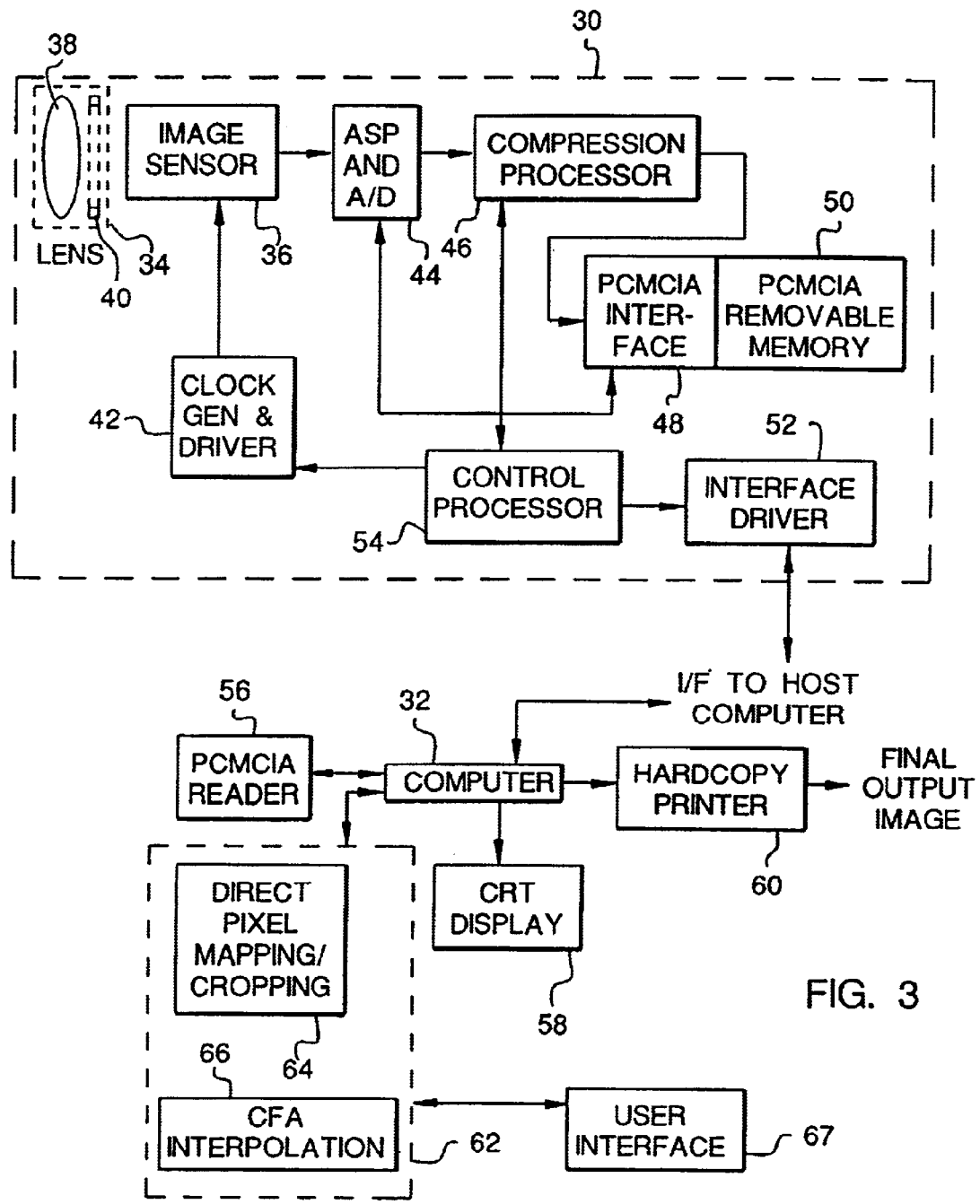
FIG. 3 is a block diagram of an electronic imaging system capable of using direct input to output pixel mapping according to the invention.

Beginning with FIG. 3, a system block diagram shows a camera 30 and a host computer 32. The camera 30 includes an optical section 34 for directing image light upon an image sensor 36, typically a single image sensor such as a charge-coupled device (CCD). The image sensor 36 includes an array of discrete light sensitive picture elements overlaid with a color filter array (CFA) pattern to produce color image data corresponding to the CFA pattern. The optical section includes a lens 38 and a shutter-aperture device 40 for regulating the exposure of the image light upon the image sensor 36. A clock generator and driver circuit 42 provides the waveforms necessary for generating the color image data from the image sensor 36, and the output data is applied to an analog signal processing (ASP) and analog/digital (A/D) conversion section 44, which produces digital CFA data from the color image data.

The resultant digital data is applied to a digital signal processor 46, which may compress the image data using, e.g., a numerically lossless or visually lossless compression technique employing DPCM coding, and otherwise process the image data for storage. The processed digital CFA data is applied to a removable memory 50 via an output interface 48. In operation, the CFA image data represents an image of a fixed size, usually an image substantially corresponding to the actual size of the image sensor 36. Consequently, the memory 50 stores the digital CFA image data from a fixed number of picture elements corresponding to this fixed image size. Moreover, the digital CFA image data stored in the memory 50 may be contained within an image file that also describes the type of color filter array pattern used on the image sensor. Furthermore, the image file may contain a low resolution rendition of the image, i.e., a thumbnail image, such as described in U.S. Pat. No. 5,164,831, entitled "Electric Still Camera Providing Multi-Format Storage of Full and Reduced Resolution Images", and filed in the names of Daniel W. Kuchta and Peter J. Sucy, which is incorporated herein by reference.

The output interface 48 is a memory card interface adapted to a conventional card interface standard, such as the PCMCIA card interface standard, such as described in the *PC Card Standard*, published by The Personal Computer Memory Card International Association, Sunnyvale, Calif., March 1997. The removable memory 50 accordingly is a non-volatile PCMCIA memory card containing either solid state memory, such as Flash EPROM memory, or a small hard drive (categorized as a PCMCIA-ATA Type III Hard Drive under the PCMCIA card interface standard). Another card interface standard is the CompactFlash ATA with DOS file format. Alternatively, other non-volatile storage devices may be used, such as a floppy disk magnetic medium or optical storage (in such cases, a suitable interface and a conventional read/write head).

In addition, the camera includes a host computer interface driver 52 for directly connecting the camera 30 to the host computer 32, for example, to download the digital CFA data corresponding to the captured images. (In this process, the removable memory 50 may serve as a buffer memory or a separate buffer memory (not shown) may be provided.) The camera 30 further includes a control processor 54 for controlling (a) the clock generator and driver circuit 42, (b) the digital signal processing chain comprising the ASP and A/D section 44, the digital signal processor 46 and the output interface 48, and (c) the interface driver 52. The interface driver 52 provides a conventional computer interface, such as a SCSI or IEEE-1394 interface. Consequently, the digital CFA data from the camera 30 interfaces with the host computer 32 either through the interface driver 52, or through a card reader 56 that receives the removable memory 50.

In order to produce an output image, the host computer 32 includes application programs for processing the captured images and producing a soft copy on a display 58 or a hard copy on a printer 60 (or, e.g., a film writer or the like). For example, the application programs include an algorithm section 62, which applies direct pixel mapping/cropping 64 concurrent with CFA interpolation 66, an da user interface 67. The user interface 67 provides user operated means for cropping the input image to an image ize different from the fixed image size provided by the camera; in particular, the cropped image will have a different (e.g., smaller) number of picture elements than the fixed number of picture elements provided to the computer. (On the other hand, the output image, depending on the image size selected by the user, may have a larger number of pixels than the fixed number of picture elements provided to the computer.) The application programs then interpolate full color data for each picture element of the output image from the smaller number of picture elements and produce an interpolated output image having the selected output image size.

Figure 4:
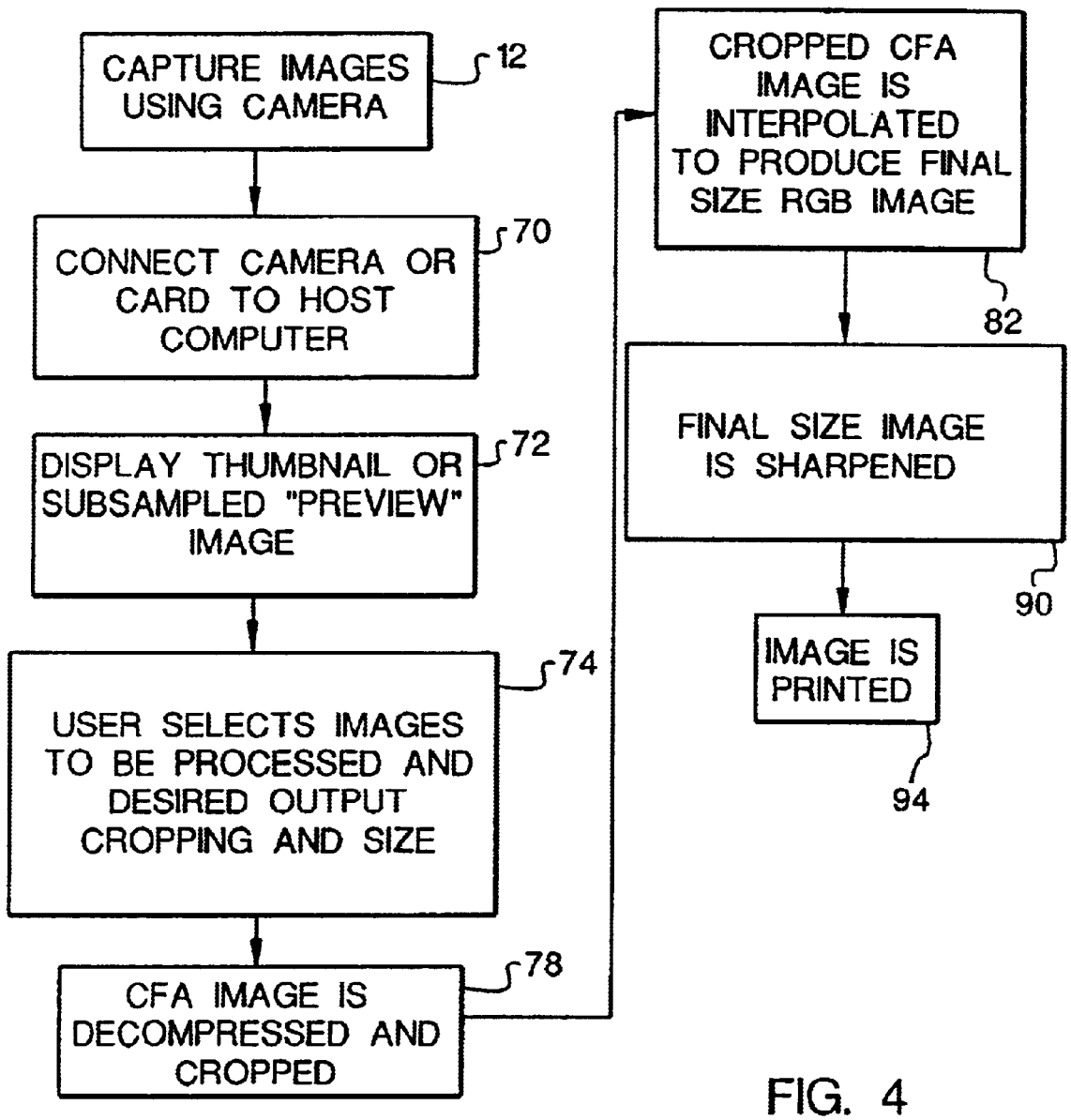
FIG. 4 is a flow diagram of a technique for capturing and processing image data using direct input to output pixel mapping according to the invention.

Operation of the imaging system according to the invention is shown in the flow diagram of FIG 4., and a representation of the image size for selected steps is shown in FIG. 5. The user operates the camera 30 to take pictures in the capture step 12, and then connects the camera or the card to the host computer 32 in a connect step 70. The digital CFA image 10 for each of the captured images (FIG. 5), or alternatively for each of the thumbnail images, is then downloaded to the computer 32. The captured images are displayed in a "thumbnail" or subsampled format in a preview step 72. The user then selects the image(s) to be processed, and also specifies the desired cropping and output image size in a selection/cropping step 74. The size can either be specified in pixels, or in the final print size which is then used to automatically determine the appropriate size in pixels knowing the printer resolution (in pixels per inch). This user intervention is performed at a user input stage 76 shown in FIG. 5 before interpolation of the image data.

The 1536×1024 Bayer pattern digital CFA image data from the camera is decompressed and cropped as specified by the user in a decompression/cropping step 78, for example a 768×768 square portion 80 of the image may be used, as shown in FIG. 5. The CFA interpolation and spatial processing are then combined in a single processing step 82, as shown in more detail in FIG. 6 or FIG. 7, to produce the final output image data 84 as shown in FIG. 5, which, in this example, is a 1536×1536 pixel image. The CFA interpolation step 82 may practice any of a number of known interpolation techniques. For instance the interpolation techniques in the following patents may be used: U.S. Pat. No. 5,373,322, entitled "Apparatus and method for adaptively interpolating a full color image utilizing chroma gradients", and U.S. Pat. Nos. 5,506,619 and 5,629,734, both entitled "Adaptive color plan interpolation in a single sensor color electronic camera". Each of these patents in incorporated herein by reference.

Figure 6:
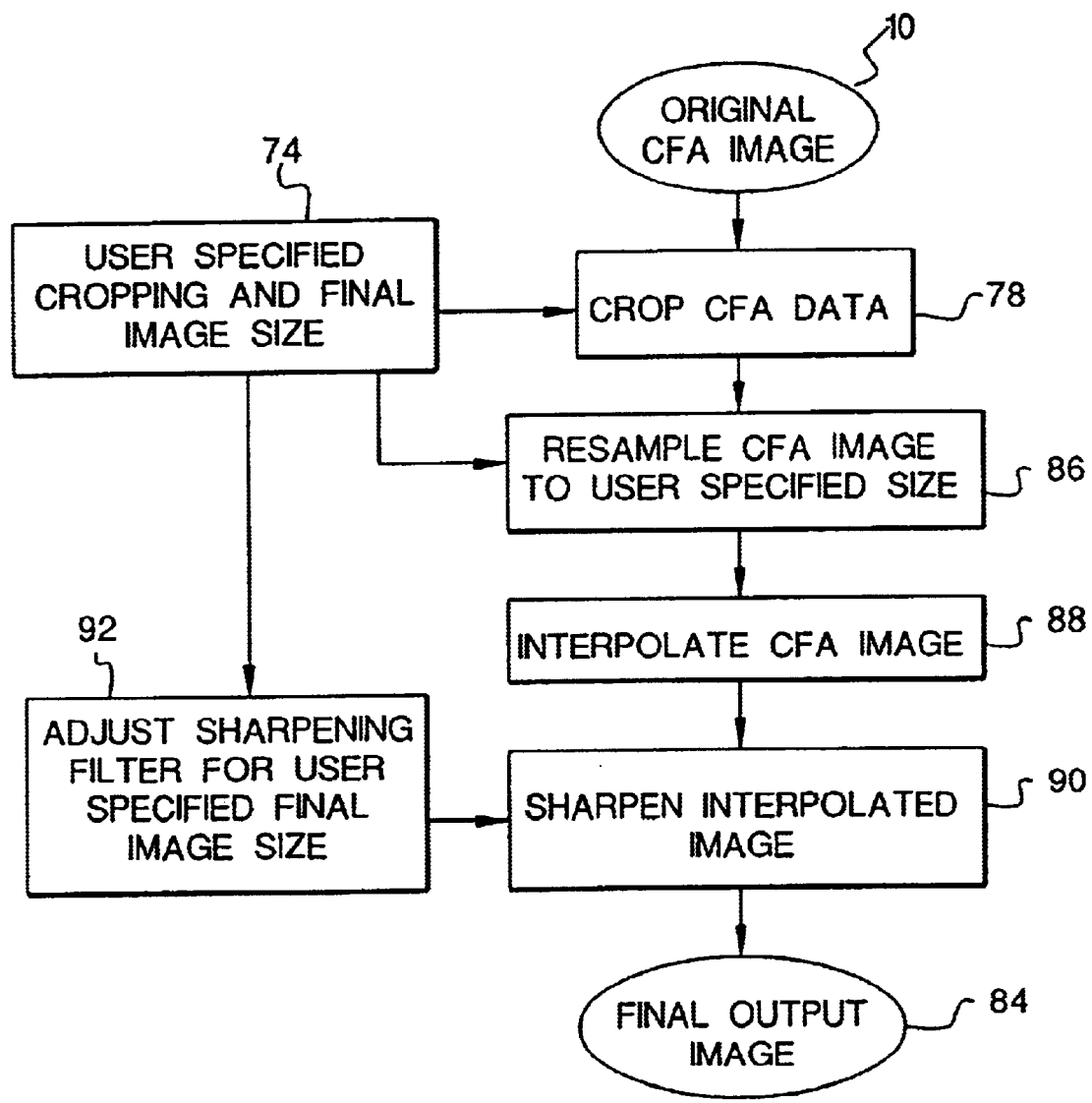
FIGS. 6 and 7 are diagrams of alternative techniques for performing CFA interpolation and spatial processing.
Figure 7:
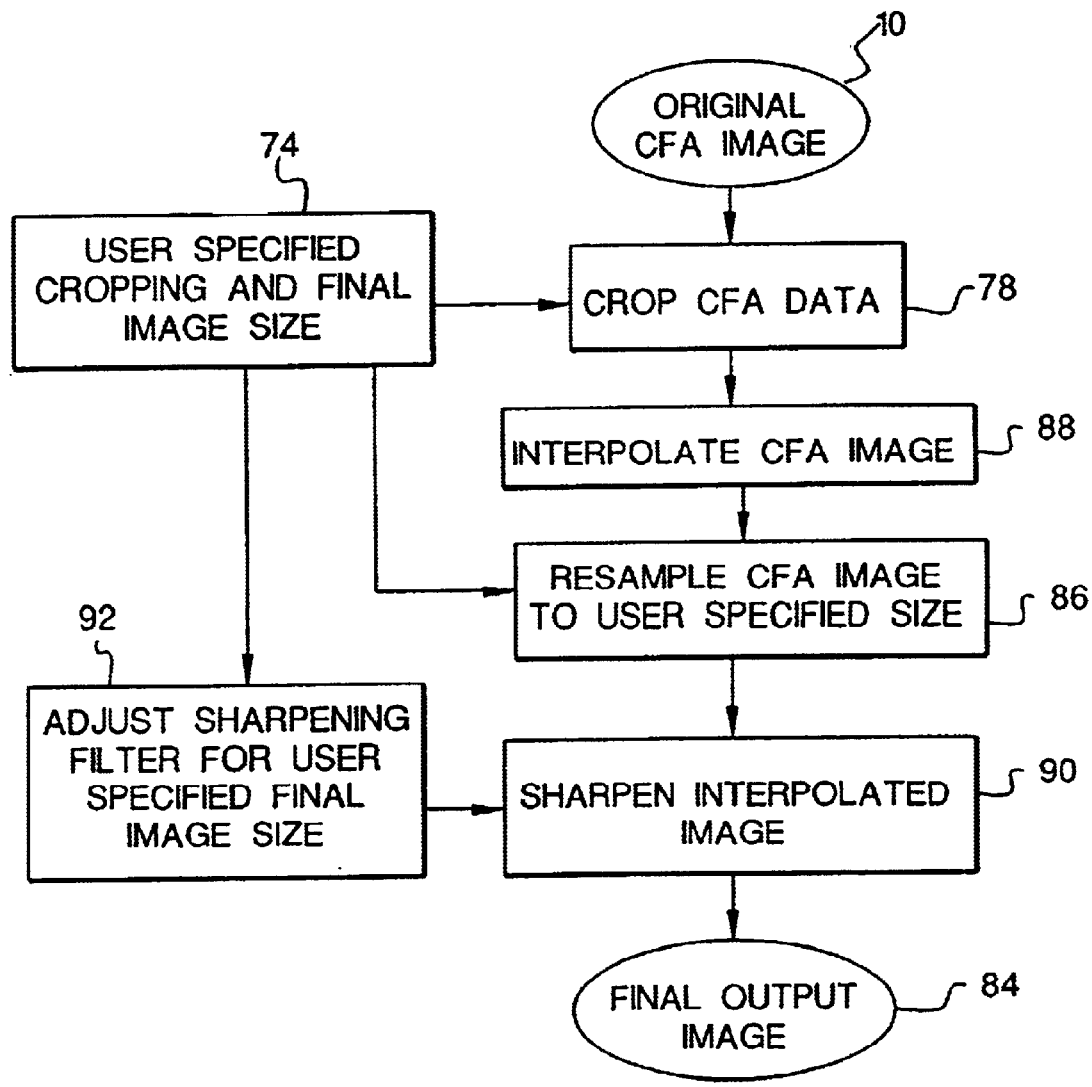

In FIG. 6, the cropped CFA image 80 is resampled up to a user specified size (in a resampling step 86), which is then CFA interpolated (in an interpolation step 88). In FIG. 7, the CFA interpolation step 88 is performed first, followed by the resampling step 86. After the final size image record is interpolated, the image is sharpened in a single sharpening step 90. This sharpening may use the technique described in U.S. Pat. No. 5,696,850 entitled "Automatic image sharpening in an electronic imaging system" and incorporated herein by reference. This patent used a modulation transfer function (MTF) calibration file from the camera and the printer to determine the appropriate sharpening filter for optimally sharpening digital reproductions of any size taken by an electionic camera. The image data is finally printed out in hardcopy form in a printing step 94 (FIG. 4).

The invention has been described with reference to a preferred embodiment. However, it will be appreciated that variations and modifications can be effected by a person of ordinary skill in the art without departing from the scope of the invention. For instance, the host computer function described in relation to FIG. 3, including the algorithm sectin 62 and the user interface 67, could all be integrated into the camera 30. In this manner, "finished" cropped and resized image files could be directly provided by the camera 30.

PARTS LIST

10 CFA image
12 capture step
14 CFA interpolation step
16 CFA interpolated image
18 cropping step
20 final output image
22 cropped portion
24 interpolating step
30 camera
32 host computer
34 optical section
36 image sensor
38 lens
40 shutter-aperture device
42 clock generator and driver circuit
44 ASP and A/D section
46 DSP
48 output interface
50 removable memory
52 interface driver
54 control processor
56 card reader
58 display
60 hard copy printer
62 algorithm section
64 direct pixel mapping/cropping
66 CFA interpolation
67 user interface
70 connect step
72 preview step
74 selection/cropping step
76 user input stage
78 decompression/cropping step
80 cropped image
82 processing step
84 final output image data
86 resampling step
90 sharpening step
92 adjustment step
94 printing step

What is claimed is:

1. A digital camera employing a single sensor capture device to capture a color image, said digital camera comprising:

an image sensor comprised of discrete light sensitive picture elements overlaid with a color filter array (CFA) pattern to produce color image data corresponding to the CFA pattern;

an A/D converter for producing digital CFA image data from the color image data;

a user interface for cropping the digital CFA image data to an image size smaller than said fixed image size;

a processor for interpolating full color image data from the cropped digital CFA image data; and a memory for storing the full color image data.

2. The digital camera as claimed in claim 1 wherein the processor also responds to a selected output image size to provide an output image size different from the fixed image size.

3. The digital camera as claimed in claim 1 wherein the processor also sharpens the full color image.

4. The digital camera as claimed in claim 1 wherein the memory is removable.

5. The digital camera as claime din claim 4 wherein the memory is a removable memory card.

6. The digital camera as claimed in claim 5 wherein the memory is Flash EPROM.

7. The digital camera as claimed in claim 2 wherein the output image size is specified in pixels.

8. The digital camera as claimed in claim 1 wherein the processor uses adaptive interpolation in interpolating the full color image data.

9. A method for capturing and processing color images in a digital camera, said method comprising the steps of:

capturing an array of picture elements through a color filter array (CFA) to produce color image data corresponding to the CFA pattern;

converting the color image data into digital CFA image data;

cropping the digital CFA image data to an image size smaller than said fixed image size;

interpolating full color image data from the cropped digital CFA image data; and storing the full color image data in a removable memory of the digital camera.

10. The method as claimed in claim 9 further comprising the step of sharpening the full color image.

\* \* \* \* \*